United States Patent
Burgdorf et al.

(10) Patent No.: US 8,326,490 B2
(45) Date of Patent: Dec. 4, 2012

(54) STEERING ANGLE SENSOR SYSTEM AND METHOD FOR MEASURING A STEERING ANGLE

(75) Inventors: Christian Burgdorf, Offenbach (DE); Klaus Rink, Rodenbach (DE); Frank Hickl, Gelnhausen (DE); Patrick Schäfer, Dortmund (DE); Alexander Kolbe, Groβ-Zimmern (DE)

(73) Assignee: Continental Teves AG & Co. oHG (DE)

( * ) Notice: Subject to any disclaimer, the term of this patent is extended or adjusted under 35 U.S.C. 154(b) by 741 days.

(21) Appl. No.: 12/282,918

(22) PCT Filed: Mar. 16, 2007

(86) PCT No.: PCT/EP2007/052539
§ 371 (c)(1),
(2), (4) Date: Sep. 24, 2009

(87) PCT Pub. No.: WO2007/107530
PCT Pub. Date: Sep. 27, 2007

(65) Prior Publication Data
US 2010/0057299 A1    Mar. 4, 2010

(30) Foreign Application Priority Data

Mar. 17, 2006 (DE) .................. 10 2006 012 771
Mar. 30, 2006 (DE) .................. 10 2006 014 700

(51) Int. Cl.
*B62D 15/02* (2006.01)

(52) U.S. Cl. ............................... 701/42; 701/41
(58) Field of Classification Search ............ 701/41, 701/42; 180/441, 443, 446
See application file for complete search history.

(56) References Cited

U.S. PATENT DOCUMENTS

| 5,019,981 | A | 5/1991 | Oshita et al. |
|---|---|---|---|
| 6,314,355 | B1 | 11/2001 | Mizuta et al. |
| 7,562,591 | B2 * | 7/2009 | Lee .................. 73/862.331 |
| 2001/0024202 | A1 | 9/2001 | Kobayashi |

FOREIGN PATENT DOCUMENTS

| DE | 40 06 683 A1 | 9/1990 |
|---|---|---|
| DE | 40 08 105 A1 | 9/1990 |
| DE | 100 33 536 A1 | 2/2001 |
| DE | 10 2005 009 489 A1 | 8/2006 |
| EP | 0 982 564 A1 | 3/2000 |
| EP | 1 238 891 B1 | 9/2002 |
| EP | 1 607 720 A2 | 12/2005 |
| GB | 2 233 085 A | 1/1991 |
| JP | 2000-88605 | 3/2000 |

* cited by examiner

Primary Examiner — Richard M. Camby

(57) ABSTRACT

A steering angle sensor system for measuring a steering angle in a motor vehicle. The steering angle sensor system includes a magnetic encoder which is coupled to at least one magnetic field sensor that senses a variation in the steering angle even when the ignition is switched off, and an electronic memory for storing the steering angle variation. The steering angle sensor system also includes at least one magnetic-field-sensitive element which is coupled to the magnetic encoder for detecting the occurrence of steering movements at an early time in order to at least partially activate the steering angle sensor system and/or another system.

20 Claims, 3 Drawing Sheets

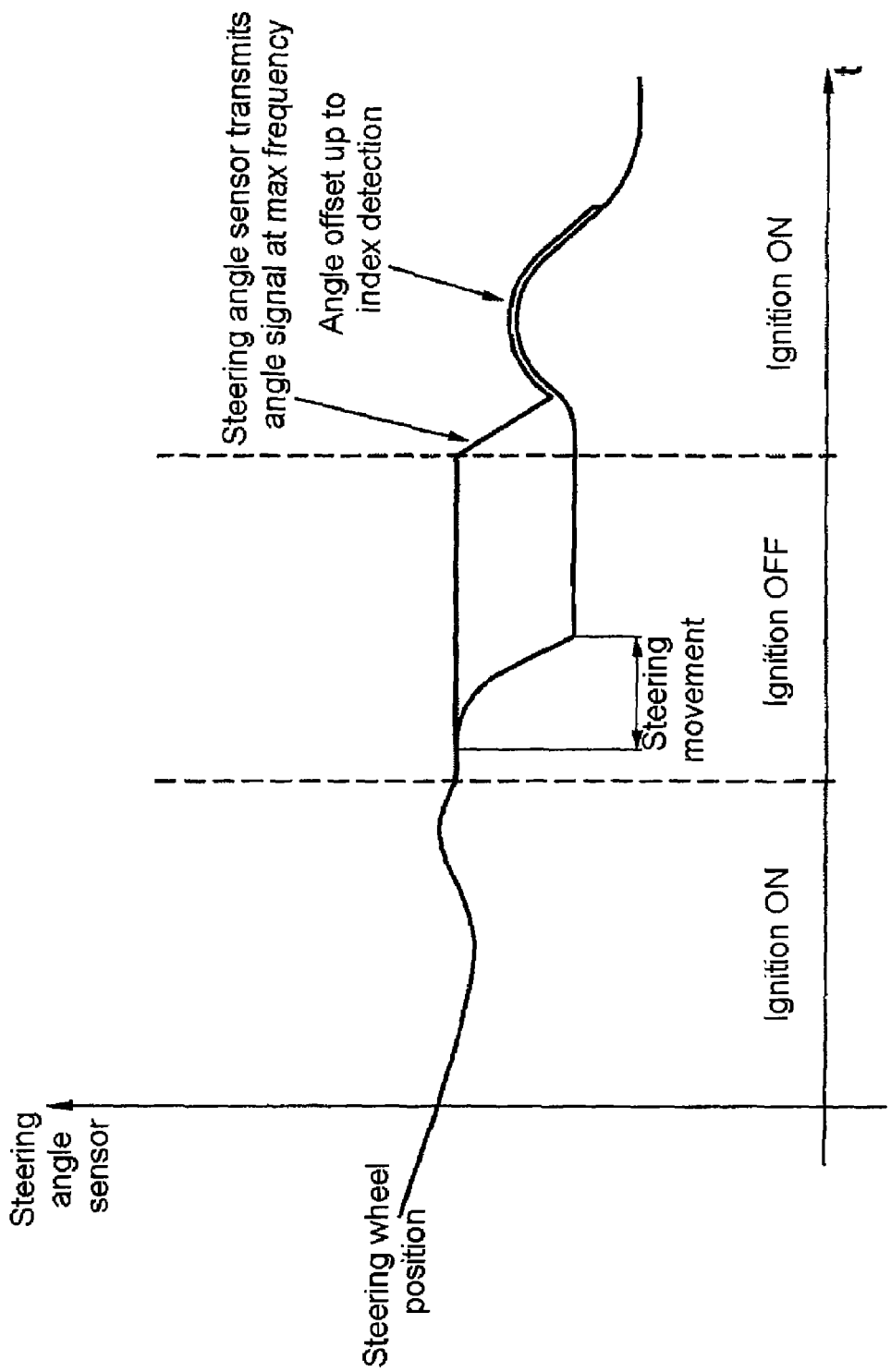

STEERING ANGLE SENSOR SYSTEM AND METHOD FOR MEASURING A STEERING ANGLE

CROSS-REFERENCE TO RELATED APPLICATIONS

This application is the U.S. national phase application of PCT International Application No. PCT/EP2007/052539, filed Mar. 16, 2007, which claims priority to German Patent Application No. DE102006012771.4, filed Mar. 17, 2006 and German Patent Application No. DE102006014700.6, filed Mar. 30, 2006, the contents of such applications being incorporated by reference herein in their entirety.

BACKGROUND OF THE INVENTION

1. Field of the Invention

The invention relates to a steering angle sensor system and a method for measuring the steering angle in a motor vehicle.

2. Description of the Related Art

Methods for measuring angles or angle measuring devices are frequently used to sense the steering angle in motor vehicles in order, for example, to determine the steering angle in vehicle movement dynamics controllers (ESP). Furthermore, it is also necessary to sense the steering angle for motor vehicle control systems which carry out an active steering intervention.

In this context it is also known that particular requirements are made of the availability of the steering angle measurement through the possibility of active steering interventions by a motor vehicle control system. A specific requirement which such a motor vehicle control system makes of the angle measuring device during the time directly after the activation of the motor vehicle is to know the steering angle even though steering movements or indirect steering movements, caused by external interference influences, may even occur when the vehicle is not operating, and they have to be taken into account.

Document EP 1 238 891 B1 discloses a steering angle sensor which, in addition to a coding disk whose position, and therefore the absolute angle, within a revolution is sensed by means of sensors, has a mechanically coupled counting wheel for sensing the number of revolutions. The absolute angle is calculated from a combination of the output signals of two magnetic field sensors and the position of the counting wheel. In order to be able to carry out an absolute angle measurement using this sensor directly after the motor vehicle starts, the steering angle sensor has to be supplied with voltage even during an inactive state of the vehicle, as a result of which, depending on the duration of this state, the electrical power supply of the motor vehicle is heavily loaded. Furthermore, the mechanism is relatively complex and subject to wear.

In document EP 0 874 751 B1 it is proposed to use a mechanical counting unit in addition to a rotational angle sensor which measures the absolute angle within a revolution with the aid of a coding disk. In this context, the mechanical counting unit is mechanically coupled to the coding disk and counts the revolutions. The absolute rotational angle at each time is also sensed over more than one revolution. A disadvantage with this design is the extremely complex mechanism of the coding disk and of the counting unit, as well as the transmission of torque by the mechanical coupling, which is subject to wear and does not function quietly.

Document DE 103 44 267 A1 describes a method which uses a semi-relative steering angle sensor. Here, in the state in which the ignition of the vehicle is switched off steering wheel movements are sensed by the steering angle sensor and stored electronically. When the ignition is activated, and there were no faults to be registered, these data are used to calculate the current steering angle.

This system is disadvantageous insofar as here too both the sensor and the electronic memory have to be supplied with power in the inactive state of the vehicle, which proves a drain on the vehicle battery. Furthermore, in the event of faults the angle is re-standardized and cannot be sensed directly by the steering angle sensor. The standardization is carried out by detecting straight-ahead running during travel, in which case this straight-ahead running is assessed on the basis of the profile of the yaw rate over time.

SUMMARY OF THE INVENTION

An object of the present invention is to describe a steering angle sensor system and a method for measuring the steering angle in a motor vehicle. The intention is that it will be possible to use the latter to measure an angle with high angular resolution over a range of a plurality of revolutions. The intention is here to avoid continuously complete supply of power to the steering angle sensor system, in particular to the measuring sensor elements, even though the angle of one or more angle variations is sensed and stored while the ignition of the motor vehicle is switched off. Furthermore, the intention is for the device to have the lowest possible degree of wear, to generate as little noise as possible and to be cost-effective.

The object is achieved according to aspects of the invention by a steering angle sensor system, as described hereinafter.

The invention relates to the idea of detecting at an early time the occurrence of steering movements and/or of at least one variation in the steering angle, using a sensor element, in particular an additional magnetic-field-sensitive element. Furthermore, a steering angle sensor arrangement is used to measure a steering angle, however in such a way that during a vehicle state of inactive ignition, the steering angle sensor arrangement is largely placed in an inactive state, in which case the, in particular, additional magnetic-field-sensitive element remains active or partially active and detects the variation in the magnetic field when a steering movement occurs, in response to which variation the steering angle sensor arrangement is entirely or partially activated. The activated steering angle sensor arrangement senses and stores the steering angle movement or movements until it is placed in the largely inactive state owing to the failure of steering movements to occur or until the ignition of the motor vehicle is activated. The stored steering angle data are then transmitted without delay to the motor vehicle control system.

According to aspects of the invention, contactless measuring principles are applied which avoid wear and the generation of noise.

The term the steering angle sensor arrangement is understood to mean an arrangement for sensing a steering angle in the steering system of a motor vehicle. In this context, the steering angle sensor arrangement functions in a contactless fashion, in particular by means of magnetic coupling. For this reason, the steering angle sensor arrangement has at least one encoder and at least one sensor, and in this context, the encoder rotates with the steering movements and the sensor senses the rotational movements of the encoder. In particular magnetic encoders and sensors are used. The steering angle sensor system according to aspects of the invention also belongs to the generic type of these steering angle sensor arrangements. A steering angle sensor arrangement can be embodied in such a way that it performs absolute and/or relative or incremental angle measurements.

Sensor elements which are composed of at least one individual magnetic field sensor element are preferably used as an additional magnetic-field-sensitive element, and in this context said individual magnetic field sensor element can be, in particular, a reed switch, a Hall element or a Hall sensor bridge or some other magnetic field sensor such as, for example, an AMR or GMR sensor. In this context, the magnetic-field-sensitive element may particularly preferably also contain a circuit which detects a defined value of the magnetic field or a defined variation in the magnetic field and subsequently triggers a function, in particular a switching function. It is also preferred that the magnetic-field-sensitive element senses a change in the magnetic field by a specific value, as a result of which a switching threshold of an electronic switch is exceeded, in particular that of a Mosfet.

The overall variation in the steering angle is understood to be the angle by which the steering angle has varied overall within a phase of inactive ignition of the motor vehicle, that is to say the sum of the variations in the steering angle taking into account the respective rotational direction. In this context, variations in the steering angle with different rotational directions cancel one another out proportionally with the result that the direct variation in the steering angle after the abovementioned phase is considered exclusively, without taking into account the time profile of the steering angle.

It is expedient that the steering angle sensor system has an electronic computer module into which the electronic memory is integrated, and that the electronic computer module has, in particular, at least one computer unit in which at least one output driver is integrated. By means of the electronic computer module it is possible to calculate the overall variation in the steering angle and by means of at least one output driver this steering angle value can be evaluated as a defined electrical signal.

During the time of inactive ignition of the motor vehicle in which there is no variation in the steering angle or there are no directly successive variations in the steering angle, the steering angle sensor arrangement is preferably placed, after a defined time, in a state of limited functionality in which the power consumption, and therefore in particular the loading on the vehicle battery, are kept low.

It is preferred that the steering angle sensor arrangement forms or calculates, from the sensed variations in the steering angle, in particular whenever there is a variation in the steering angle, an overall variation of the steering angle and stores it. As a result, acquired information is combined, and the memory can be kept relatively small.

It is expedient that after the ignition of the motor vehicle has been activated, the stored steering angle data, in particular the overall variation in the steering angle, are transmitted from the steering angle sensor arrangement to the electronic control unit (ECU) of the motor vehicle control system at a raised data transmission rate, in particular at a maximum clock rate. This method step makes the current steering angle or the preceding variations in the steering angle available immediately after the ignition of the motor vehicle has been activated.

It is preferred that if an additional information item is present in the electronic control unit (ECU) of the motor vehicle control system which indicates that a continuous minimum power supply is not ensured, in particular when the ignition of the motor vehicle is inactive, the steering angle sensor arrangement is standardized, or it is preferred that a message is generated indicating that standardization has to be performed. This increases the reliability of the method, in particular with respect to a failure of the power supply.

It is expedient that after each activation of the ignition of the motor vehicle, adjustment occurs between the overall steering angle and an absolute steering angle within 360° during operation of the vehicle. The overall steering angle is calculated from the last steering angle stored in the electronic control unit (ECU), and from the overall variation in the steering angle transmitted by the steering angle sensor arrangement. The absolute steering angle within 360° is calculated, in particular, from a detected index sequence of the magnetic encoder during a steering movement. If the adjustment detects a difference in steering angle, a new steering angle value is calculated on the basis of the absolute angle within 360° and the number of steering revolutions known from the overall steering angle. As a result, measuring errors, in particular measuring errors which occur during a vehicle state of inactive ignition, are compensated for or eliminated.

It is preferred that the steering angle sensor system is connected via the electronic control unit (ECU) and at least one bus system to further motor vehicle systems such as an active steering system or a navigation system. As a result, other systems can access the steering angle which is acquired by means of the method.

It is expedient to integrate all the components of the steering angle sensor system, with the exception of the magnetic encoder, or the sensor unit and in particular the magnetic-field-sensitive element on a chip. In this context, this chip can be embodied as an ASIC or as a programmable, integrated circuit. This configuration allows the steering angle sensor system on which the method, according to aspects of the invention, is based to be implemented in a relatively cost-effective way.

The magnetic-field-sensitive element is preferably supplied with power in a clocked fashion, which reduces its power consumption.

It is expedient that the electronic computer module can process additional information items and output them in a defined fashion, in particular via the second computer unit. One of these additional information items is particularly preferably the index information relating to the magnetic encoder on the basis of which the absolute angle value can be calculated within 360°. This calculation of the absolute angle value within 360° is very particularly preferably carried out by the electronic computer module. This absolute angle information is either transmitted as additional information to the electronic control unit (ECU) or is transmitted to the electronic control unit (ECU) via a separate signal path between the electronic computer module and the electronic control unit (ECU).

The invention relates to a computer program product which comprises an algorithm which is suitable for carrying out the method according to the invention.

The method, according to the aspects of invention, can be used for all types of motor vehicles, that is to say passenger cars, trucks and single-track motor vehicles. One use of this method is particularly appropriate whenever the steering angle is to be made available directly after the ignition of the motor vehicle has been activated.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures:

FIG. 3 shows the time profile of a steering angle adjustment by evaluating the detection of the absolute angle within one revolution after the motor vehicle has been activated.

DETAILED DESCRIPTION OF THE PREFERRED EMBODIMENTS

Figure 1:
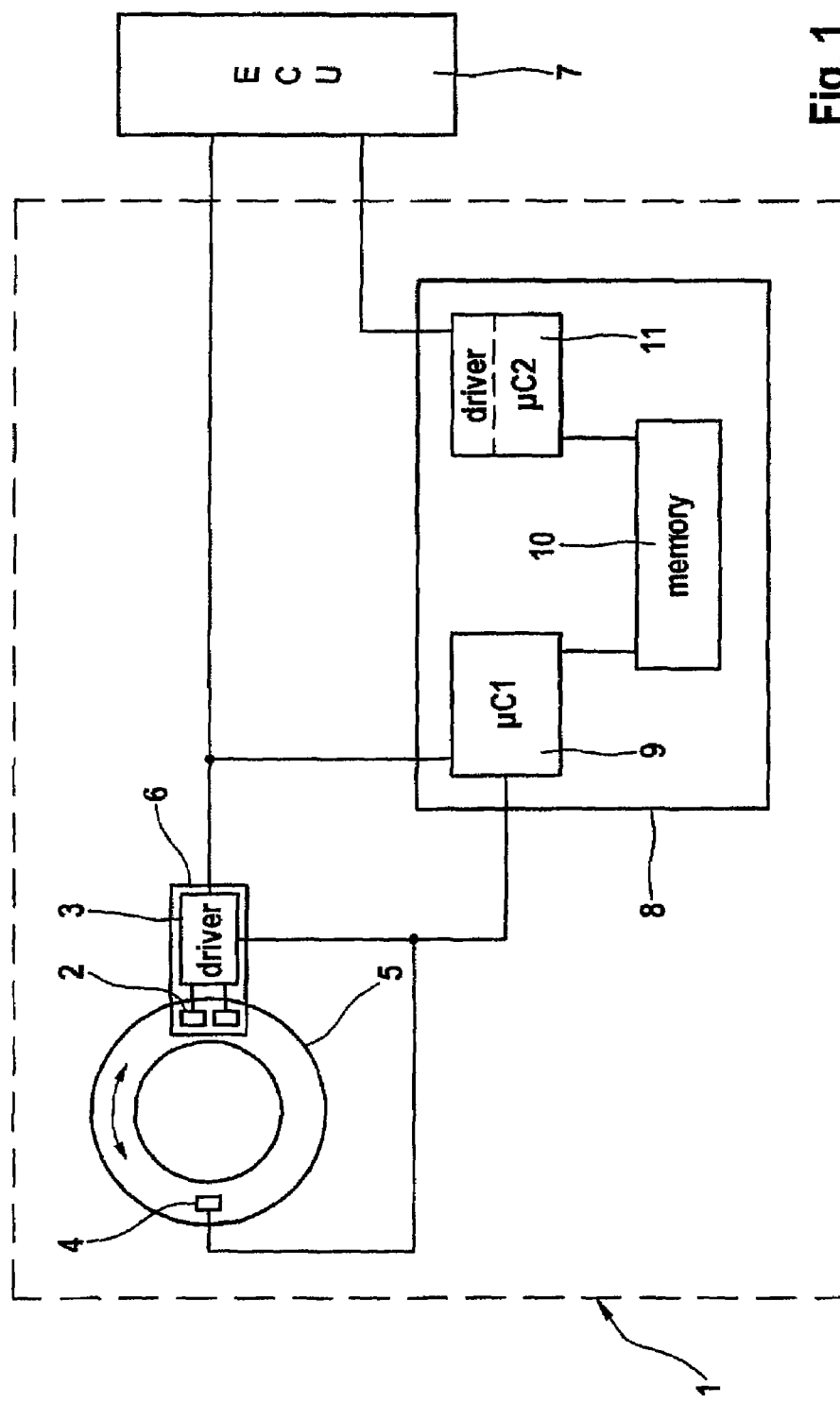
FIG. 1 shows a steering angle sensor system according to aspects of the invention and its components.

In FIG. 1, the steering angle sensor system 1 comprises the magnetic encoder 5 which is magnetically coupled to the magnetic field sensors 2 of the sensor unit 6 and to the magnetic-field-sensitive element 4, with a sensor output driver 3 and an interpolation unit (not illustrated in more detail) being additionally integrated into the sensor unit 6. The sensor unit 6 and the magnetic-field-sensitive element 4 transmit their data to a first computer unit 9 which, in addition to an electronic memory 10 and a second computer unit 11 with integrated output driver, is integrated into an electronic computer module 8. The sensor unit 6 and the second computer unit 11 of the electronic computer module 8 transmit their data to the electronic control unit (ECU) 7 of the motor vehicle control system.

Figure 2:
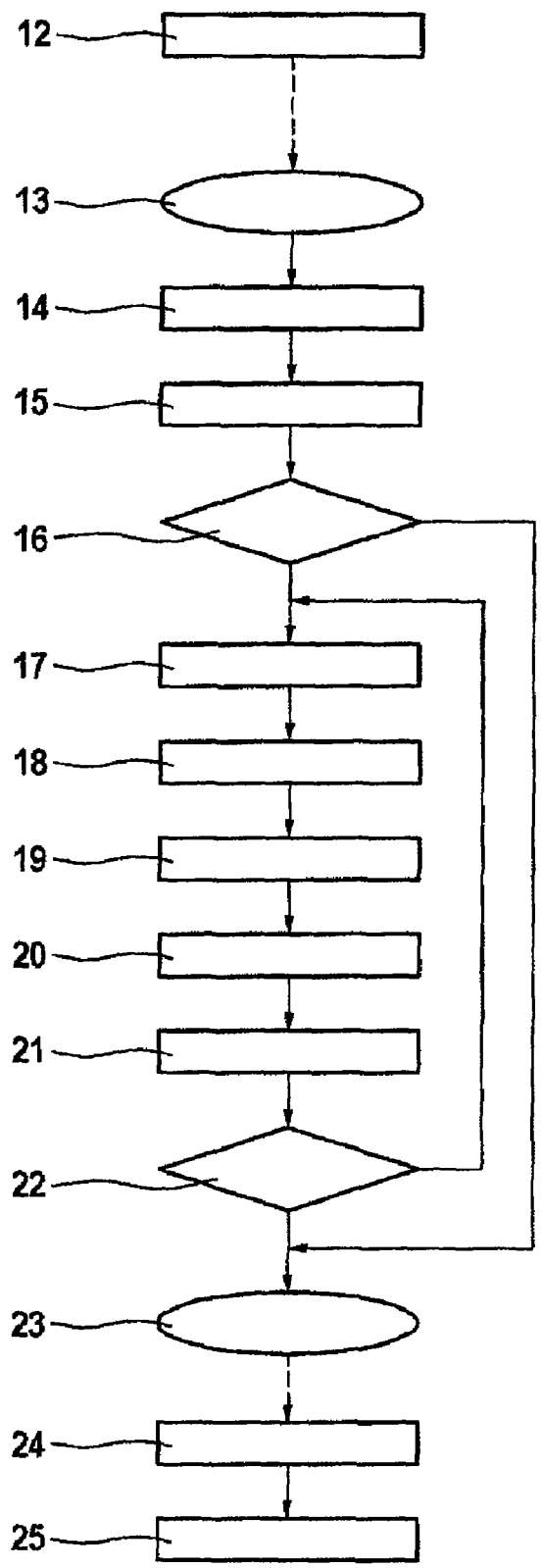
FIG. 2 shows a flowchart of the method.

FIG. 2 illustrates the sequence of the method using a flowchart. The method starts with method block 12 in which the ignition of the motor vehicle is active and the absolute overall steering angle is present. In method block 13, the ignition of the motor vehicle is deactivated, after which, in method block 14, the last available steering angle is stored in the electronic control unit (ECU) 7 of the motor vehicle control system. After this the steering angle sensor system 1 is placed in a state of limited functionality within method block 15. Method block 16 checks through the use of the magnetic-field-sensitive element 4 to determine whether a steering movement is taking place. If this is the case, method block 17 follows, and if this is not the case method block 23 follows. In method block 17, certain parts of the steering angle sensor system 1 are activated, with at least parts of the sensor unit 6 and of the electronic computer module 8 being activated. In method block 18, the magnetic field sensors 2 of the sensor unit 6 sense the steering movement and further steering movements which immediately follow and transmit them to the electronic computer module 8 which calculates the overall change in the steering angle in method block 19 and stores it in the electronic memory 10 in method block 20. Within method block 21, the steering angle sensor system 1 is returned to a state of limited functionality. Consequently, as long as the state of inactive ignition of the motor vehicle lasts, method block 22 checks whether further steering movements subsequently occur, and this is followed by method block 17, and if they do not occur it is followed by method block 23 in which the ignition of the motor vehicle is activated. Directly after this, in method block 24, the steering angle sensor system 1 is activated and in method block 25 it transmits the stored overall change in the steering angle without delay and at the maximum clock rate to the electronic control unit (ECU) 7 of the motor vehicle control system.

FIG. 3 illustrates an exemplary time profile of the steering angle or steering wheel position available in the electronic control unit (ECU) 7 of the motor vehicle control system. During the "ignition ON" phase, the steering angle always follows the current steering wheel position. In the "ignition OFF" phase, the available steering angle does not change despite the occurrence of steering wheel movements. If the ignition of the motor vehicle is activated again, the stored overall steering angle is transmitted with a maximum frequency to the electronic control unit (ECU) 7 of the motor vehicle control system, after which the latter corresponds to the steering wheel position with a relatively small error. In the further time profile, the absolute steering angle within one revolution is detected by means of the steering angle sensor system and the angle offset between the steering wheel position—detected accurately by means of the absolute angle—and the available steering angle is determined. This is followed by an adjustment in which the detected absolute steering angle is used to eliminate the angle offset.

The method of functioning of the steering angle sensor system 1 according to FIG. 1 is described below by way of example:

The steering angle sensor system 1 includes a specific magnetic encoder 5 which has two different adjoining magnetized tracks (not illustrated in more detail) with alternating polarity on two adjacent circumferences. In the combination of the two magnetized tracks, absolute angle values are encoded which are detected as defined index sequences by the sensor and/or by the steering angle sensor system 1 and are detected or interpreted as absolute angles within 360°. Furthermore, the steering angle sensor system 1 has a sensor unit 6 which contains two magnetic field sensors and one output driver 3, a magnetic-field-sensitive element 4 and an electronic computer module 8 which contains a first computer unit 9, an electronic memory 10 and a second computer unit 11 with integrated output stage.

The encoder 5 is magnetically coupled to the two magnetic field sensors 2 of the sensor unit 6. Each encoder track is sensed by a magnetic field sensor 2. The change in the steering angle (number of signal edges), the direction of rotation (phase shift between the output signals of the magnetic field sensors) and the absolute steering angle within one revolution (signal pattern) are obtained from the output signals of the magnetic field sensors 2. The sensor unit 6 additionally contains an interpolator for signal processing. The sensor unit 6 outputs a defined output signal, which contains all the abovementioned information, via the integrated output driver 3. In the case of an activated ignition of the motor vehicle, said signal is transmitted to the electronic control unit (ECU) 7 of the motor vehicle control system.

Apart from being magnetically coupled to the sensor unit 6, which is embodied as an ASIC in the exemplary embodiment, the magnetic encoder 5 is also magnetically coupled to the magnetic-field-sensitive element 4, which is embodied, for example, as a Hall element which has a particularly simple design and requires only a low operating current. This magnetic-field-sensitive element 4 senses any change in the magnetic field which is caused by a minimum steering movement.

Directly after the transition from active to inactive ignition of the motor vehicle, the last available steering angle is stored in the ECU 7, and the steering angle sensor system 1 is placed in a functionally very limited state ("standby" or "sleep") in which only the magnetic-field-sensitive element 4 is functionally capable. If a steering movement occurs, this is registered by the magnetic-field-sensitive element 4. After this, the magnetic-field-sensitive element 4 brings about the activation ("wake-up") of the sensor unit 6, of the first computer unit 9 and of the electronic memory 10. All the following changes in the steering angle are sensed by the sensor unit 6 and interpreted by the first computer unit 9. In this context, the overall change in the steering angle is always calculated and stored in the electronic memory 10. If there are no immediately following further steering movements, the steering angle sensor system 1 is returned to the abovementioned functionally very limited state until the magnetic-field-sensitive element 4 registers the occurrence of a steering movement again or until the ignition of the motor vehicle is activated.

In the course of the activation of the ignition of the motor vehicle, the steering angle sensor system 1 is completely activated and the overall change in the steering angle which is saved or finally stored in the electronic memory 10 is converted by the second computer unit 11 with integrated output stage into an electrical signal which is largely compatible with the output signal of the sensor unit 6. This signal has the information about the overall change in the steering angle and does not have the information about the time profile of the changes in the steering angle. This signal is an artificially generated quasi-signal which is transmitted at a maximum clock rate.

During the state of inactive ignition of the motor vehicle, the electronic control unit (ECU) 7 of the motor vehicle control system in the exemplary embodiment registers whether a suitable continuous minimum power supply is present, in particular whether the terminal of the vehicle battery is disconnected or too weak. If there is information indicating that no sufficient power supply is ensured, defined standardization of the steering angle sensor system 1 is requested with the intervention of the driver (for example by means of defined steering movements). This is done by means of an optical and acoustic warning.

A further additional information item relates to the occurrence of three activations of the steering angle sensor system during a motor vehicle state of inactive ignition, as a result of which in each case no change in the steering angle is sensed. The occurrence of this case is detected by the first computer unit 9 and stored in the electronic memory 10, and transmitted to the ECU as a result of activation of the ignition of the motor vehicle. The presence of this information also brings about standardization of the steering angle sensor system 1 with the intervention of the driver.

After the activation of the ignition of the motor vehicle, the current steering angle is adjusted, said angle resulting from the last steering angle value stored in the ECU 7 and the steering angle value transmitted by the steering angle sensor system 1, with the absolute steering angle value within one revolution, which value is sensed on an up to date basis during operation of the vehicle by means of the special encoder 5. If a deviation occurs in this respect, the new absolute overall steering angle is determined by virtue of the fact that the currently available number of steering revolutions is retained and the absolute steering angle within one revolution is transferred.

The absolute steering angle within 360° is determined or calculated either in the sensor unit 6 or in the electronic computer module 8 respectively, and is transmitted in each of these two cases either as an additional information item or via a separate signal path to the ECU 7. In this context, this absolute steering angle is calculated on the basis of the index sequence which can be formed from the two signals of the encoder tracks which are respectively sensed by means of the sensor unit 6.

In another exemplary embodiment, the two signals which are output by the sensor unit 6 and which contain the information about the time profile of the two encoder track movements are transmitted directly to the ECU 7, which detects therefrom or calculates therefrom the index sequence from which the absolute steering angle within 360° is calculated.

In further embodiments, either the sensor unit 6 or the electronic computer module 8 detects the index sequence or calculates the index values and transmits it/them to the ECU 7, which calculates the absolute steering angle within 360° therefrom.

In one specific exemplary embodiment, the index sequence is detected in the sensor unit 6, or calculated, and transmitted to the electronic computer module 8 which transmits this index signal to the ECU 7, directly or after defined signal processing.

In the exemplary embodiment, the ECU 7 controls an active steering system. Furthermore, the ECU 7 is connected to the satellite navigation system of the motor vehicle via a CAN bus.

In another exemplary embodiment, after deactivation of the ignition of the motor vehicle, the last available steering angle is stored in the electronic memory 10 of the steering angle sensor system. After the ignition has been activated, it is transmitted to the ECU 7 in addition to the overall change in the steering angle.

In a further exemplary embodiment of the invention, the calculation of the absolute overall steering angle takes place completely or a certain proportion of it takes place in the steering angle sensor system and a certain proportion in the steering angle sensor arrangement. In order to make available the steering angle data or the absolute overall steering angle, and in particular additional information, the steering angle sensor system or the steering angle sensor arrangement is connected to at least one bus system. The data communication with further systems takes place via this at least one bus system, which is embodied in particular as a CAN bus.

In one example according to aspects of the invention, the method for measuring the steering angle is modified in such a way that certain steps in the method are carried out by the steering angle sensor system or the steering angle sensor arrangement instead of by the ECU. The configuration of the steering angle sensor system or of the steering angle sensor arrangement is correspondingly adapted.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for measuring a steering angle of a steering mechanism in a motor vehicle, the method comprising the steps of:
   continuously monitoring, by a magnetic field sensor, steering movement of the steering mechanism, the magnetic field sensor being magnetically coupled to a magnetic encoder of the steering mechanism;
   activating a steering angle sensor in response to the magnetic field sensor detecting steering movement, the steering angle sensor sensing a variation in the steering angle; and
   storing the variation in the steering angle in a memory device.

2. The method as claimed in claim 1, wherein the at least one sensor element is a magnetic-field-sensitive element.

3. The method as claimed in claim 1 further comprising the step of varying an operating state of the steering angle sensor arrangement upon variation in the steering angle.

4. The method as claimed in claim 1 further comprising the step of maintaining the steering angle sensor arrangement in a state of limited functionality during inactive ignition of the motor vehicle in which there is no variation in the steering angle or there are no directly successive variations in the steering angle.

5. The method as claimed in claim 4 further comprising the step of at least partially activating the steering angle sensor arrangement from the state of limited functionality when at least one variation occurs in the steering angle.

6. The method as claimed in claim 5 further comprising the step of returning the steering angle sensor arrangement to a state of limited functionality after there are no further steering movements.

7. The method as claimed in claim 1 further comprising the steps of:
calculating an overall variation in the steering angle from the sensed variations in the steering angle; and
storing the overall variation in the steering angle.

8. The method as claimed in claim 7 further comprising the step of transmitting the overall variation in the steering angle from the steering angle sensor arrangement to an electronic control unit (ECU) of the motor vehicle control system at a raised data transmission rate.

9. The method as claimed in claim 8, wherein the raised data transmission rate is maintained at a maximum clock rate.

10. The method as claimed in claim 1 further comprising the step of transmitting the stored variation in the steering angle from the steering angle sensor arrangement to an electronic control unit (ECU) of the motor vehicle control system at a raised data transmission rate.

11. The method as claimed in claim 10, wherein the raised data transmission rate is maintained at a maximum clock rate.

12. The method as claimed in claim 10 further comprising the step of standardizing the steering angle sensor arrangement if an information item is present in the electronic control unit (ECU) of the motor vehicle control system indicating that a continuous power supply value is less than a pre-determined threshold value.

13. The method as claimed in claim 10 further comprising the step of generating a message indicating that standardization has to be performed if an information item is present in the electronic control unit (ECU) of the motor vehicle control system indicating that a continuous power supply value is less than a pre-determined threshold value.

14. The method as claimed in claim 7 further comprising the step of calculating an overall steering angle from the last steering angle stored in the electronic control unit (ECU) and from the overall variation in the steering angle transmitted by the steering angle sensor arrangement.

15. The method as claimed in claim 14 further comprising the step of adjusting between the overall steering angle and an absolute steering angle within 360° after each activation of an ignition of the motor vehicle.

16. The method as claimed in claim 15 further comprising the step of calculating the absolute steering angle from a detected index sequence of a magnetic encoder during a steering movement.

17. The method as claimed in claim 16 further comprising the step of calculating a new steering angle value on the basis of the absolute angle within 360° if a difference in steering angle is detected.

18. The method as claimed in claim 1, wherein the steering angle sensor arrangement is connected to further motor vehicle systems via an electronic control unit (ECU) of the motor vehicle control system and at least one bus system.

19. The method as claimed in claim 18, wherein further motor vehicle systems comprise an active steering system or a navigation system.

20. A computer program product comprising an algorithm for implementing the steps recited in claim 1.

* * * * *